United States Patent
Yang et al.

(10) Patent No.: US 10,878,372 B2
(45) Date of Patent: Dec. 29, 2020

(54) METHOD, SYSTEM AND DEVICE FOR ASSOCIATION OF COMMODITIES AND PRICE TAGS

(71) Applicant: Shanghai Clobotics Technology Co., Ltd., Shanghai (CN)

(72) Inventors: Cong Yang, Shanghai (CN); Yan Ke, Shanghai (CN)

(*) Notice: Subject to any disclaimer, the term of this patent is extended or adjusted under 35 U.S.C. 154(b) by 224 days.

(21) Appl. No.: 16/155,196

(22) Filed: Oct. 9, 2018

(65) Prior Publication Data

US 2019/0279144 A1 Sep. 12, 2019

(51) Int. Cl.
*G06Q 10/08* (2012.01)
*G06K 7/10* (2006.01)
*G06K 7/14* (2006.01)
*G06K 9/20* (2006.01)
*G06K 9/62* (2006.01)

(52) U.S. Cl.
CPC ....... *G06Q 10/087* (2013.01); *G06K 7/10861* (2013.01); *G06K 7/1413* (2013.01); *G06K 7/1443* (2013.01); *G06K 9/2063* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 5,382,779 A * | 1/1995 | Gupta | G06K 1/121 235/383 |
| 9,195,868 B2 | 11/2015 | Ehrhart et al. | |
| 9,679,168 B2 | 6/2017 | Wang | |
| 2009/0198508 A1 | 8/2009 | Minowa | |
| 2015/0363625 A1* | 12/2015 | Wu | G06K 9/00664 382/203 |

* cited by examiner

*Primary Examiner* — Paul Danneman
(74) *Attorney, Agent, or Firm* — Erson IP (Nelson IP)

(57) ABSTRACT

A method for automatic association of commodities and price tags, comprises: S1: acquiring several pictures, carrying out unit detection on each one of the pictures, and identifying a plurality of commodity zones within each one of the pictures; S2: carrying out price tag detection on each one of the pictures, and identifying a plurality of price tag zones within each one of the pictures; S3: identifying a bar code in each one of the price tag zones, reading first commodity information corresponding to each one of the bar codes, and verifying the commodity zone corresponding to the bar code in each one of the price tag zones; S4: associating the commodity zone of each one of the bar codes with the corresponding first commodity information, and then storing the associated data into a database.

7 Claims, 8 Drawing Sheets

METHOD, SYSTEM AND DEVICE FOR ASSOCIATION OF COMMODITIES AND PRICE TAGS

CROSS-REFERENCE TO RELATED APPLICATIONS

This application claims priority to Chinese Patent Application No. 201810190303.2 with a filing date of Mar. 8, 2018. The content of the aforementioned application, including any intervening amendments thereto, is incorporated herein by reference.

TECHNICAL FIELD

The present invention relates to artificial intelligence, specifically to a method, system and device for automatic association of commodities and price tags

BACKGROUND OF THE PRESENT INVENTION

Shopping malls usually appear in clustered areas where people live along with the rapid development of the commercial economy, the improvement on the living standard of people, and the establishment of urban brand images.

A bar code is a graphic identifier which is formed for expressing a piece of information by arraying a plurality of black and white strips of different widths according to a certain coding rule. Common bar codes are parallel-line patterns formed by black strips and white strips, and the reflectivity of the black strips is greatly different from that of the white strips. A bar code contains rich information, such as the origin of an article, manufacturer, commodity name, production date, library classification number, postal starting point and destination, category, date, etc. Therefore, bar codes have been widely applied to various fields including commodity circulation, book collection, postal management, and the banking system.

Therefore, when commodities are displayed in a shopping mall, a price tag is usually pasted at the lower or upper side of each facing commodity, and more information of the commodity is usually stored by the bar code. However, during actual operation, the bar code is usually printed on the price tag, and the text message on the price tag is usually inconsistent with the information recorded on the bar code, bringing great inconvenience to the management of the shopping mall.

SUMMARY OF PRESENT INVENTION

Aiming at defects in the prior art, an objective of the present invention is to provide a method, system, and device for automatic association of commodities and price tags.

A method for automatic association of commodities and price tags provided by the present invention includes:

S1: acquiring several pictures, carrying out unit detection on each one of the pictures, and identifying a plurality of commodity zones within each one of the pictures;

S2: carrying out price tag detection on each one of the pictures, and then identifying a plurality of price tag zones within each one of the pictures;

S3: identifying a bar code in each one of the price tag zones, reading first commodity information corresponding to each one of the bar codes, and then verifying the commodity zone corresponding to the bar code in each one of the price tag zones;

S4: associating the commodity zone of each one of the bar codes with the corresponding first commodity information, and then storing the associated data into a database.

Preferably, the method also includes:

identifying a text message in each one of the price tag zones, generating second commodity information, and when the second commodity information of a price tag zone is inconsistent with the first commodity information, sending an alarm signal.

Preferably, step S3 includes:

S301: on each one of the pictures, transversely arraying a plurality of commodity zones in turn to form a commodity zone row, and transversely arraying a plurality of price tag zones in turn to form a price tag zone row, where at least one price tag zone row is formed on the upper side or/and the lower side of the commodity zone row;

S302: calculating the distance between the central point of each one of the price tag zones and the central point of each one of adjacent commodity zones, and determining the commodity zone closest to the central point of each one of the price tag zones;

S303: associating each one of the price tag zones as a target price tag zone with a commodity zone closest to the central point of each one of the price tag zones.

Preferably, step S2 includes:

S201: carrying out price tag detection on each one of the pictures, and then identifying a plurality of price tag zones within each one of the pictures;

S202: when a plurality of price tag zones are arrayed in turn along a set direction, setting the price tag zones which are arrayed in turn along the set direction as a price tag zone set;

S203: forming at least one price tag zone set in each one of the pictures, and excluding price tag zones outside of the price tag zone set.

Preferably, step S1 includes:

S101: marking the commodity zones in each one of a plurality of the detected pictures, generating a plurality of training pictures for commodity zone identification, and training a commodity identification model through the training pictures;

S102: automatically extracting a target reference line according to an object profile in each one of the pictures, and rotating each one of the pictures such that each one of the target reference lines is parallel to a set reference line;

S103: implementing enhancement processing on the aligned pictures, and inputting the pictures into the commodity identification model for identification.

Preferably, step S2 includes:

S201: marking price tag zones within each one of a plurality of the detected pictures, and generating a plurality of training pictures for price tag identification;

S202: marking to-be-excluded price tag zones within each one of a plurality of the detected pictures, and generating a plurality of training pictures for price tag exclusion;

S203: training a price tag identification model through the plurality of training pictures for price tag identification and the plurality of training pictures for price tag exclusion;

S204: automatically extracting a target reference line according to an object profile in each one of the pictures, and rotating each one of the pictures such that each one of the target reference lines is parallel to a set reference line;

S205: implementing enhancement processing on the aligned pictures, and inputting the pictures into the price tag identification model for identification.

Preferably, step S3 includes:

S301: acquiring a plurality of target commodity pictures for a target commodity corresponding to a bar code from different sites;

S302: calculating a descriptor of each one of the target commodity pictures, and determining a characteristic identifier of the target commodity according to the descriptor of each one of a plurality of the target commodity pictures;

S303: repeating steps S301-S302 to generate a descriptor for a target commodity corresponding to each one of a plurality of bar codes, and then calculating a target commodity characteristic identification model;

S304: acquiring a plurality of target commodity pictures corresponding to a bar code from different sites to form a group of training pictures for commodity bar code association;

S305: repeating S304 to generate a group of training pictures for commodity bar code association, corresponding to each one of a plurality of bar codes;

S306: training a commodity bar code association model through a plurality of groups of training pictures for commodity bar code association;

S307: determining the commodity zone corresponding to the bar code in each one of the price tag zones in turn through the target commodity characteristic identification model and the commodity bar code association model.

A system for automatic association of commodities and price tags provided by the present invention, used for implementing the method for automatic association of commodities and price tag, includes:

a commodity zone identification module for acquiring several pictures, performing unit detection on each one of the pictures, and identifying a plurality of commodity zones within each one of the pictures;

a price tag zone identification module for carrying out price tag detection on each one of the pictures and identifying a plurality of price tag zones within each one of the pictures;

a commodity bar code association module for determining a target price tag zone, corresponding to each one of the commodity zones, among a plurality of price tag zones, identifying the bar code of each one of the price tag zones, and reading the first commodity information corresponding to each one of the bar codes;

a database module for storing the corresponding relationship between the commodity zone and the first commodity information of each one of the bar codes.

A method for automatic association of commodities and price tags provided by the present invention includes:

a processor:

a memory which stores executable commands of the processor, where the processor is configured to execute, via executing the executable commands, the steps of the method for automatic association of commodities and price tags.

Comparing with the prior art, the present invention has the following beneficial effects:

1. According to the present invention, the database is established by acquiring pictures of shelves and commodities in the shopping mall identifying the commodity and the bar code in each one of the pictures, and associating the first commodity information read from each one of the bar codes with the picture of each corresponding one of the commodities one by one, thus facilitating management of commodities.

2. According to the present invention, the text message of each one of the price tag zones is identified, and then the second commodity information is generated; when the second commodity information is inconsistent with the first commodity information which is identified from the picture, an alarm signal is sent, and then the marking error on the price tag can be corrected.

3. According to the present invention, a database in which the first commodity information corresponds to the pictures of commodities one by one. In such a way, the information of a commodity can be searched when the picture of the commodity is obtained, and then a corresponding price tag can be printed, improving the accuracy of printing of the price tag.

DESCRIPTION OF THE DRAWINGS

By reading the detailed description of non-limiting embodiments made with reference to the following drawings, other characteristics, objectives, and advantages of the present invention will become more obvious.

DETAILED DESCRIPTION OF PREFERRED EMBODIMENTS

The present invention is described in detail in conjunction with the attached drawings and embodiments. The following embodiments will help those skilled in the art to further understand the present invention, without limiting the present invention in any form. It should be noted that, for those ordinarily skilled in the art, various modifications and improvements can be made on the basis of the concept of the present invention, which all fall within the protective scope of the present invention.

Figure 1:
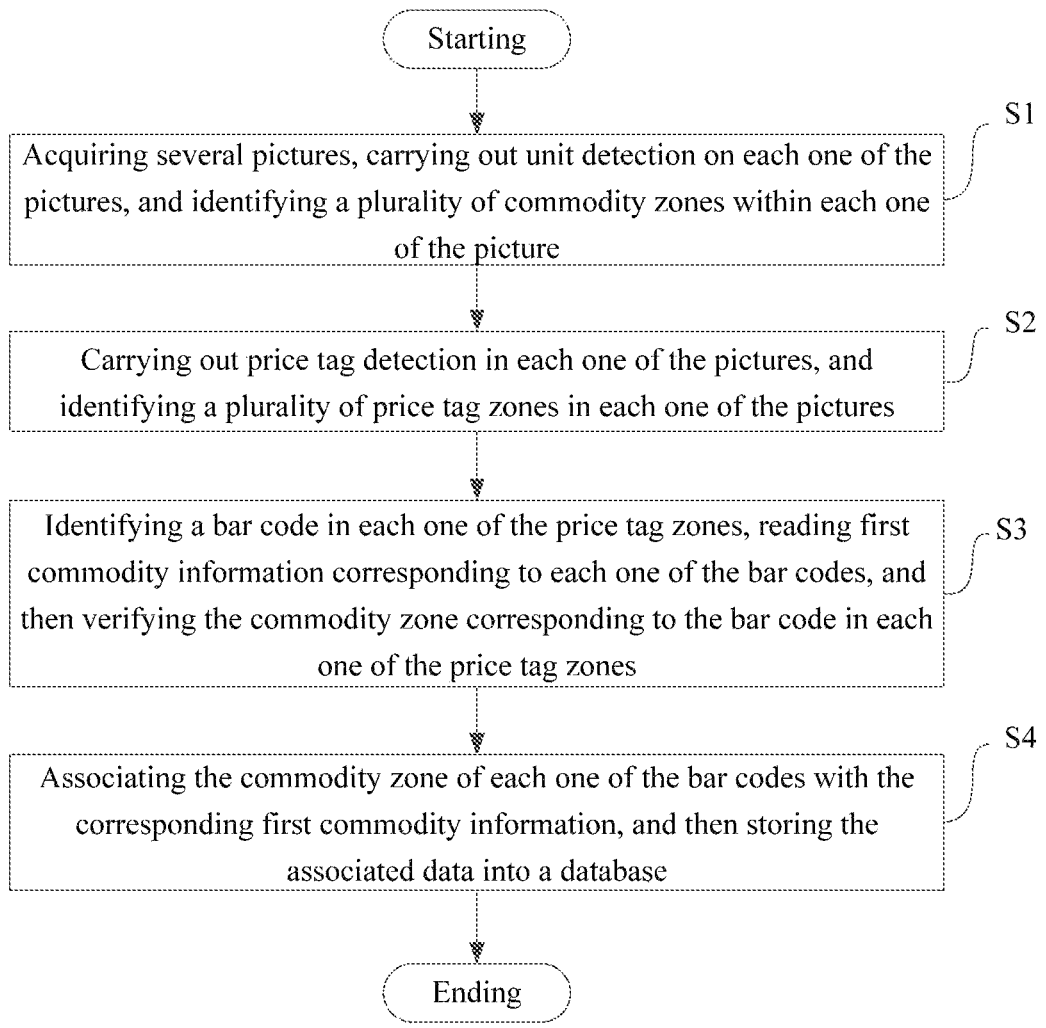
FIG. 1 is a flowchart of a method for automatic association of commodities and price tags in an embodiment of the present invention.

FIG. 1 shows a flowchart of a method for automatic association of commodities and price tags in an embodiment of the present invention. As shown in FIG. 1, the method includes the following steps:

S1: acquiring several pictures, carrying out unit detection on each one of the pictures, and identifying a plurality of commodity zones within each one of the pictures;

S2: carrying out price tag detection on each one of the pictures, and then identifying a plurality of price tag zones within each one of the pictures;

S3: identifying a bar code in each one of the price tag zones, reading first commodity information corresponding to each one of the bar codes, and then verifying the commodity zone corresponding to the bar code in each one of the price tag zones;

S4: associating the commodity zone of each one of the bar codes with the corresponding first commodity information, and then storing the associated data into a database.

In the above embodiment, the pictures are taken by a mobile phone, a camera, a robot or an unmanned aerial vehicle equipped with a camera. Each one of the pictures is a picture of a shelf in a shopping mall; each one of the pictures includes a plurality of commodities which are arrayed on the shelf in turn and bar code tags pasted on the shelf and located below corresponding commodities. Each one of the bar code tags has at least one bar code and has a text message including price, product name, and product model. Each one of the price tag zones is a zone in a picture where a bar code tag exists, and each one of the commodity zones is a zone in a picture where a commodity exists.

The method for automatic association of commodities and price tags provided in this embodiment of the present invention may also further include the following steps:

identifying a text message in each one of the price tag zones, generating second commodity information, and when the second commodity information of a price tag zone is inconsistent with the first commodity information, sending an alarm signal.

Namely, when the text message of a bar code tag is inconsistent with the information read from a bar code, the text message on the bar code tag has errors or a bar code is incorrectly printed.

The first commodity information and the second commodity information include at least any one or more a plurality of the following information:

price of a commodity;
name of a commodity,
origin of a commodity;
logistic information of a commodity,
stock of a commodity
manufacturer of a commodity.

The inconsistency between the second commodity information and the first commodity information refers to inconsistency of information of the same category, for example, the inconsistency between the commodity name read from a bar code and the commodity name in the text message recorded on a bar code tag, and the inconsistency between the commodity price read from a bar code and the commodity price recorded on a bar code tag.

Figure 2:
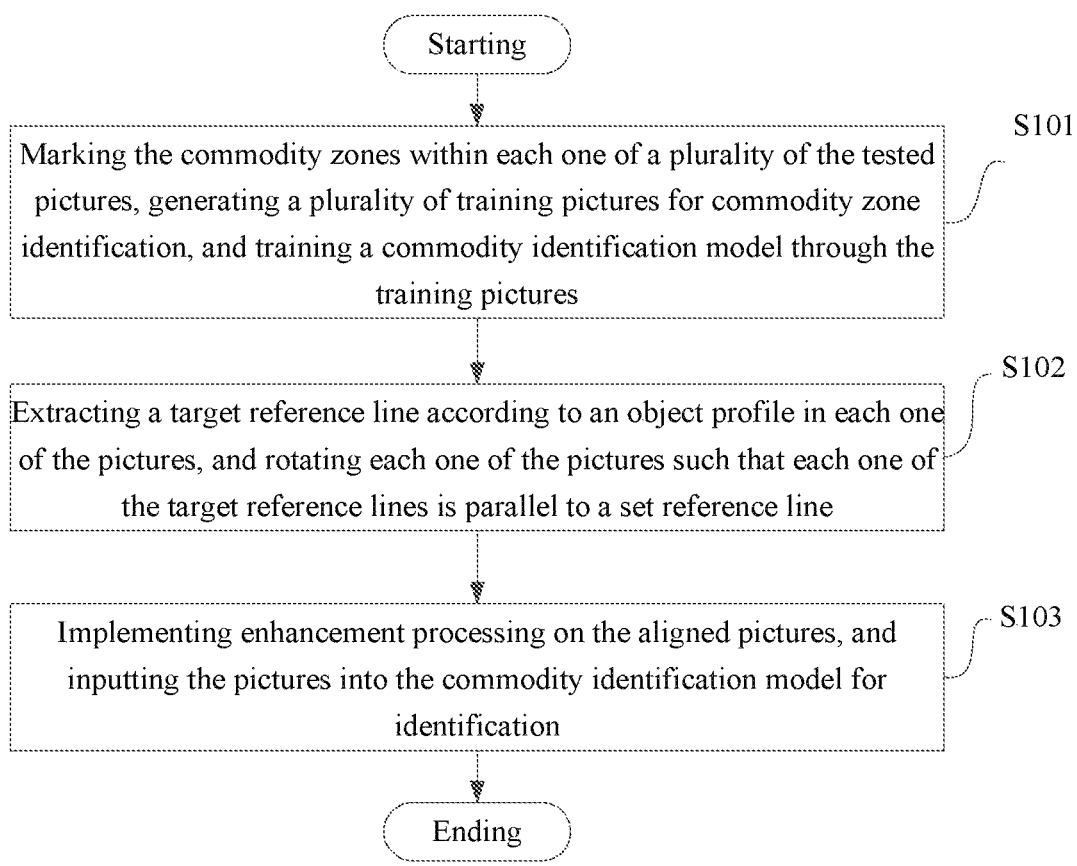
FIG. 2 is a flowchart of commodity zone identification in an embodiment of the present invention.

FIG. 2 shows a step flowchart of commodity zone identification in an embodiment of the present invention. As shown in FIG. 2, step S1 includes the following sub-steps:

S101: marking the commodity zones within each one of a plurality of the detected pictures, generating a plurality of training pictures for commodity zone identification, and training a commodity identification model through the training pictures;

S102: automatically extracting a target reference line according to an object profile in each one of the pictures, and rotating each one of the pictures such that each one of the target reference lines is parallel to a set reference line;

S103: implementing enhancement processing on the aligned pictures, and inputting the pictures into the commodity identification model for identification.

Marking refers to marking of the position of a commodity zone. Specifically, the position information of a commodity zone in a picture is marked using the coordinate (x, y) of the upper left corner, the width w and the height h of the commodity zone. An edge of a shelf, extending along the horizontal direction, in a picture can be selected as the target reference line.

Figure 3:
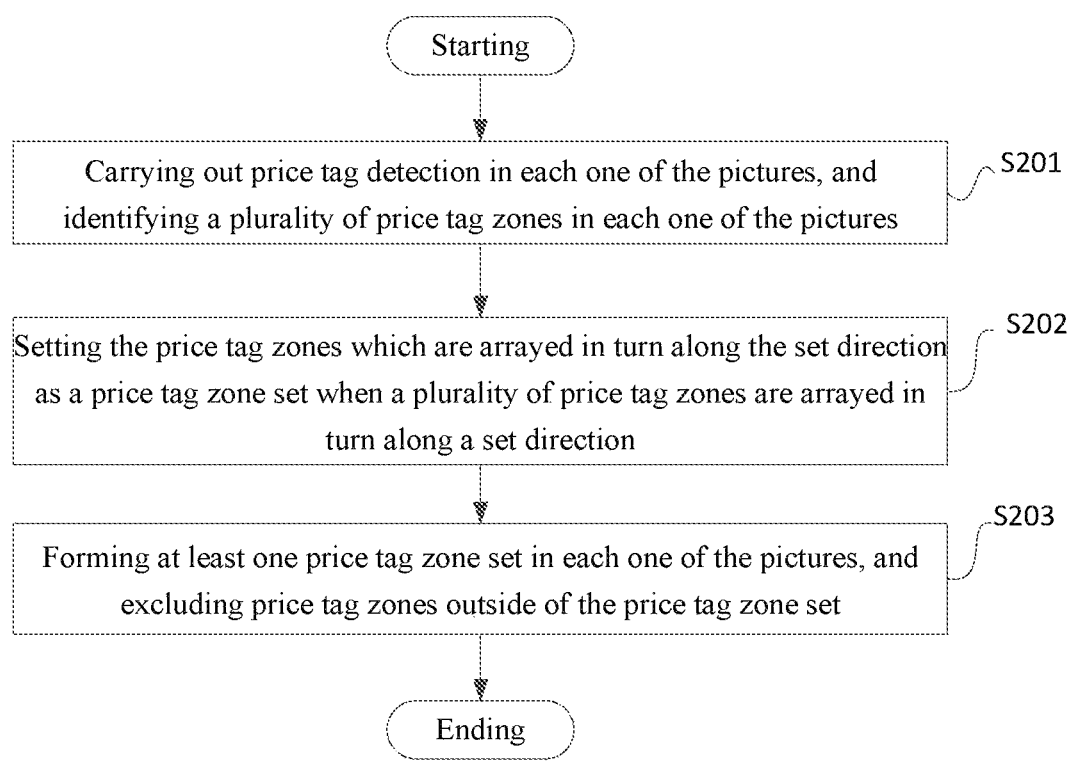
FIG. 3 is a flowchart of price tag zone identification in an embodiment of the present invention.

FIG. 3 shows a flowchart of price tag zone identification in an embodiment of the present invention. As shown in FIG. 3, step S2 includes the following sub-steps:

S201: carrying out price tag detection on each one of the pictures, and then identifying a plurality of price tag zones within each one of the pictures;

S202: when a plurality of price tag zones are arrayed in turn along a set direction, setting the price tag zones which are arrayed in turn along the set direction as a price tag zone set;

S203: forming at least one price tag zone set in each one of the pictures, and excluding price tag zones outside of the price tag zone set.

In the above embodiment, each one of the pictures is a picture of a shelf, and the bar code tags are usually pasted on a horizontal panel of the shelf, so the price tag zones are arrayed in turn along the horizontal direction to form a price tag zone set. The bar code on a commodity is usually above or below the horizontal panel. Besides, not all bar codes of commodities face outward and can be photographed, and the inconsistency in commodity height leads to inconsistency in height of the bar code on a commodity. Therefore, the bar code on a commodity is not continuous and is inconsistent in height. Thus, the bar codes, which are not continuous and are inconsistent in height, outside of the bar code zone set can be excluded.

Figure 4:
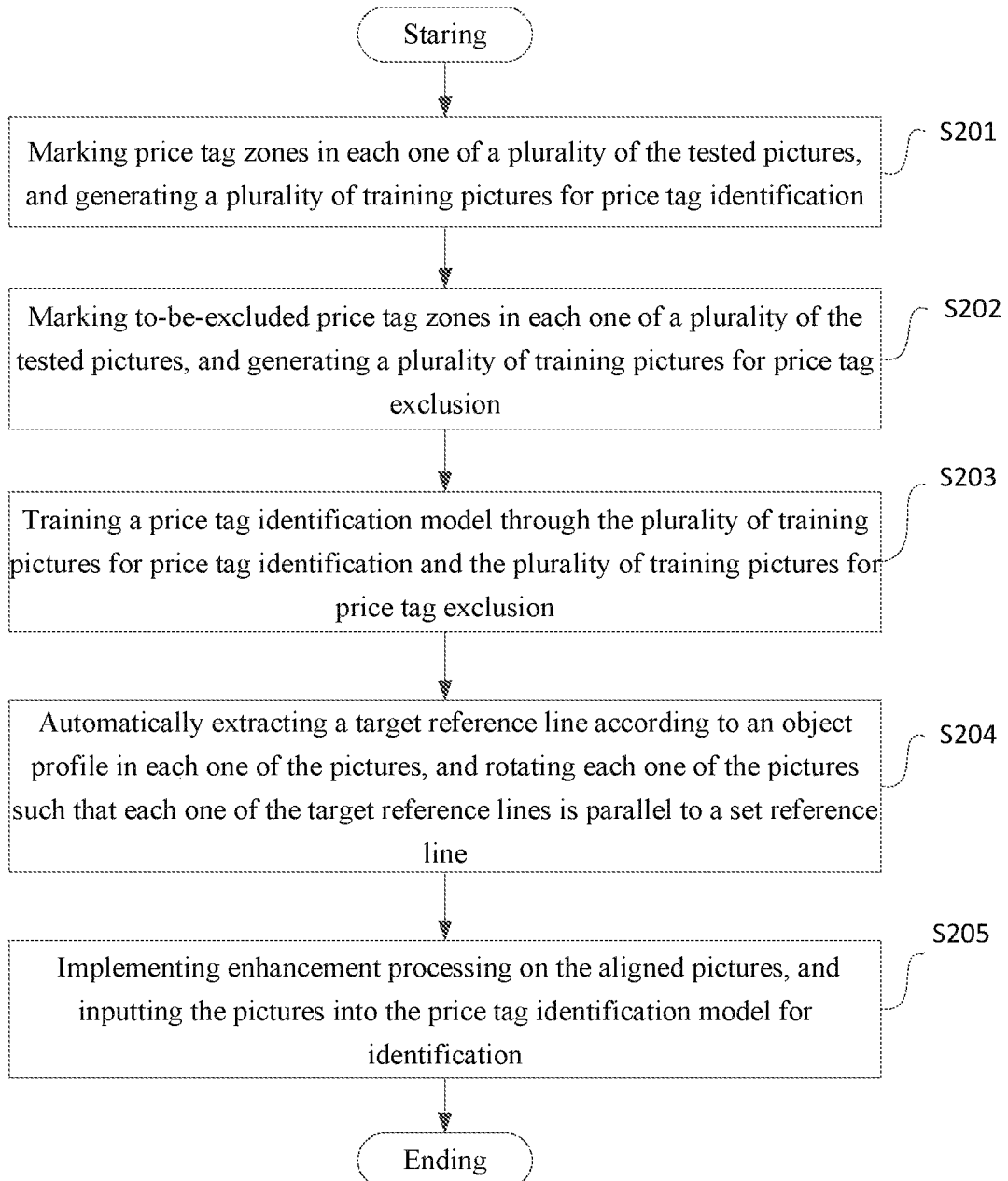
FIG. 4 is a flowchart of price tag zone identification in a modification example of the present invention.

FIG. 4 shows a flowchart of price tag zone identification in a modification example of the present invention. As shown in FIG. 4, S2 includes the following steps:

S201: marking price tag zones within each one of a plurality of the detected pictures, and generating a plurality of training pictures for price tag identification;

S202: marking to-be-excluded price tag zones within each one of a plurality of the detected pictures, and generating a plurality of training pictures for price tag exclusion;

S203: training a price tag identification model through the plurality of training pictures for price tag identification and the plurality of training pictures for price tag exclusion;

S204: automatically extracting a target reference line according to an object profile in each one of the pictures, and rotating each one of the pictures such that each one of the target reference lines is parallel to a set reference line;

S205: implementing enhancement processing on the aligned pictures, and inputting the pictures into the price tag identification modules for identification.

In the above embodiment, marking price tag zones refers to marking the position of each one of price tag zones, and marking to-be-excluded price tag zones refers to marking of price tag zones to be excluded. An edge of a shelf, extending along the horizontal direction, in a picture can be selected as the target reference line.

In a modification example, the following steps can be executed to exclude a bar code to be excluded. In such circumstances, step S2 includes the following sub-steps:

S201: classifying the price tag zones within a plurality of detected pictures into price tag zones and to-be-excluded price tag zones, and generating a plurality of training pictures for bar code identification;

S202: establishing a bar code commodity identification model through a plurality of training pictures for bar code identification;

S203: automatically extracting a target reference line according to an object profile in each one of the pictures, and rotating each one of the pictures such that each one of the target reference lines is parallel to a set reference line;

S204: implementing enhancement processing on the aligned pictures, and inputting the pictures into the price tag identification model for identification. Through the modification example, the identification of the target price tag zones and the exclusion of the to-be-excluded price tag zones can be trained through a group of training pictures, thus saving the training time of the bar code commodity identification model.

Figure 5:
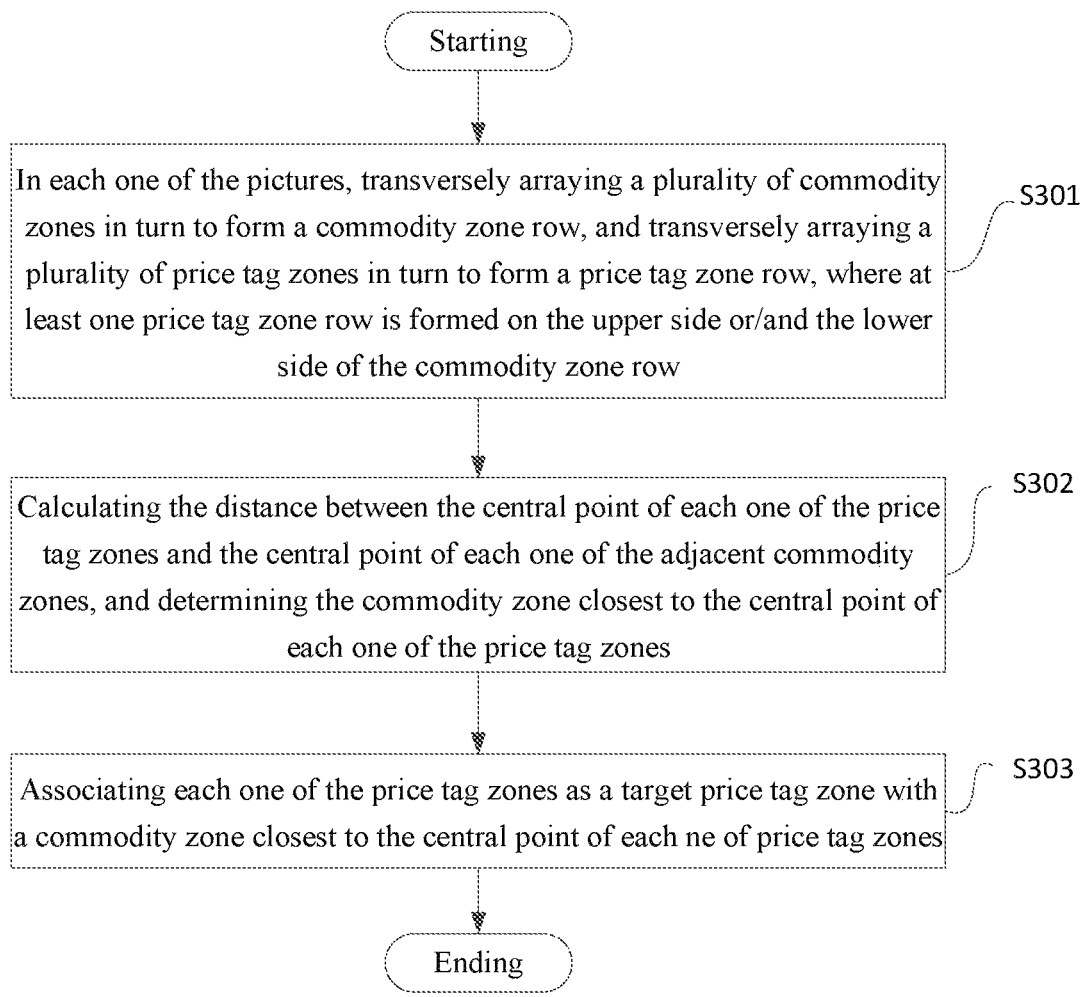
FIG. 5 is a determination flowchart of the corresponding relationship between commodity zones and price tag zones in an embodiment of the present invention.

FIG. 5 shows a determination flowchart of the corresponding relationship between a commodity zone and a price tag zone in an embodiment of the present invention. As shown in FIG. 5, step S3 includes the following sub-steps:

S301: in each one of the pictures, transversely arraying a plurality of commodity zones in turn to form a commodity zone row, and transversely arraying a plurality of price tag zones in turn to form a price tag zone row, where at least one price tag zone row is formed on the upper side or/and the lower side of the commodity zone row;

S302: calculating the distance between the central point of each one of the price tag zones and the central point of each one of adjacent commodity zones, and determining the commodity zone closest to the central point of each one of the price tag zones;

S303: associating each one of the price tag zones as a target price tag zone with a commodity zone closest to the central point of each one of the price tag zone.

In the above embodiment, bar codes are usually close to corresponding commodities, so that the commodity corresponding to a bar code can be usually be found by calculating the distances of the bar code to several adjacent commodities, and the commodity closest to the bar code is usually the commodity corresponding to the bar code. Besides, third commodity information on a commodity can be identified, for example, commodity name. Compared with the commodity information in the second commodity information on the bar code, the corresponding relationship between a bar code and a commodity can be confirmed by only one step. In a specific embodiment, a bar code and a text message in a commodity zone can be identified by an ORC identification algorithm to obtain third commodity information and second commodity information. In an embodiment, identification of the bar code of each one of price tag zones can specifically implemented by picture identification technology, or a bar code identification module can be trained through the training objects of a plurality of bar codes, and then bar codes can be identified by the bar code identification module.

Figure 6:
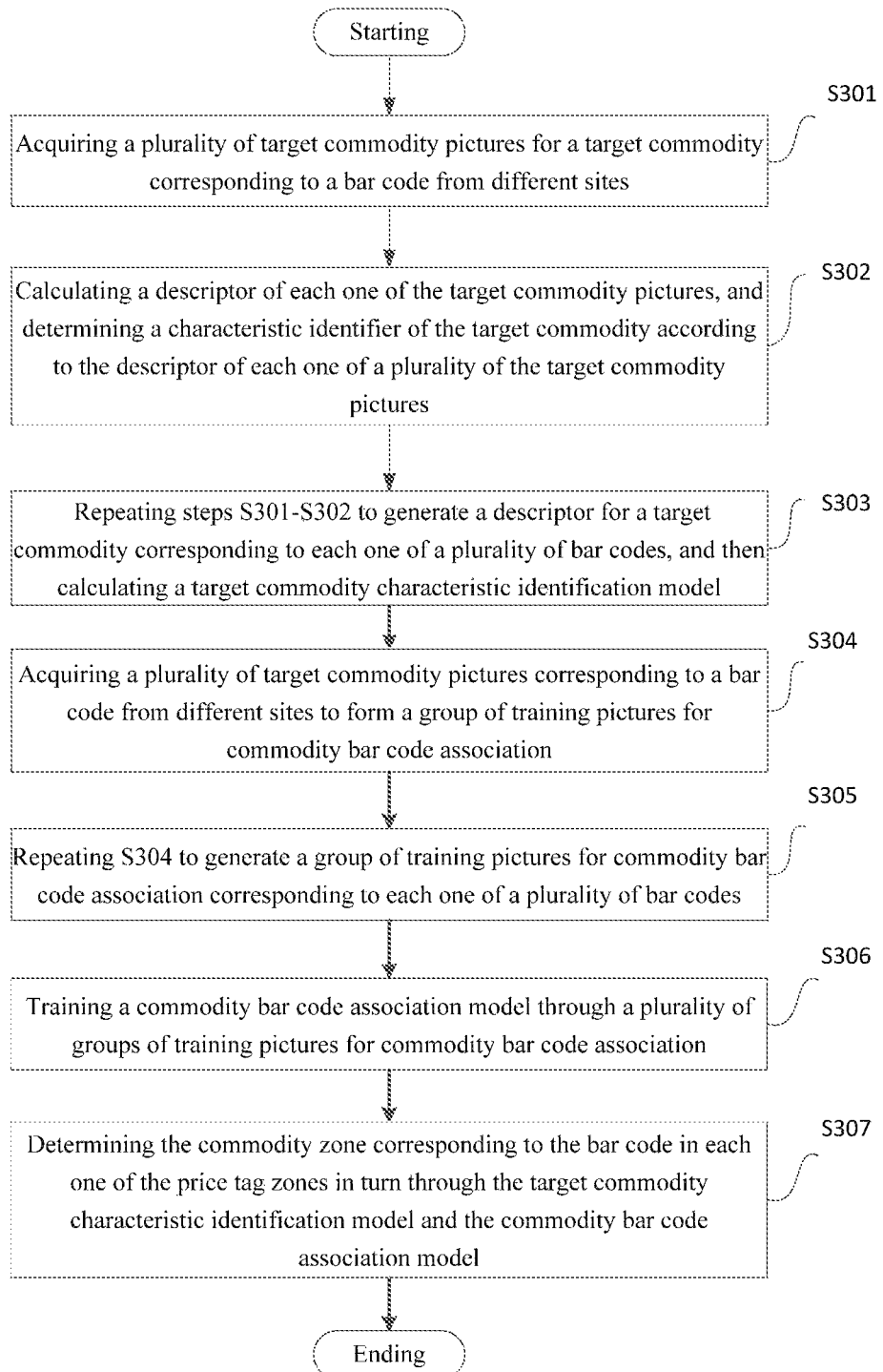
FIG. 6 is a determination flowchart of corresponding relationship between commodity zones and price tag zones in a modification example of the present invention.

FIG. 6 shows a determination flowchart of a corresponding relationship between a commodity zone and a price tag zone in a modification example of the present invention. As shown in FIG. 6, step S3 includes the following steps:

S301: acquiring a plurality of target commodity pictures for a target commodity corresponding to a bar code from different sites;

S302: calculating a descriptor of each one of the target commodity pictures, and determining a characteristic identifier of the target commodity according to the descriptor of each one of a plurality of the target commodity pictures;

S303: repeating steps S301-S302 to generate a descriptor for a target commodity corresponding to each one of a plurality of bar codes, and then calculating a target commodity characteristic identification model;

S304: acquiring a plurality of target commodity pictures corresponding to a bar code from different sites to form a group of training pictures for commodity bar code association;

S305: repeating S304 to generate a group of training pictures for commodity bar code association corresponding to each one of a plurality of bar codes;

S306: training a commodity bar code association model through a plurality of groups of training pictures for commodity bar code association;

S307: determining the commodity zone corresponding to the bar code in each one of the price tag zones in turn through the target commodity characteristic identification model and the commodity bar code association model.

In the above embodiment, the descriptor specifically is a color ratio of a target commodity picture; when the color ratio of each one of a plurality of target commodity pictures for a target commodity is obtained, each one of the target commodity pictures is determined, but the target commodity pictures are taken at different angles, so that the color ratios of the plurality of target commodity pictures may be a little different there-among. However, such difference will be far smaller than the difference caused by the misplacement of the target commodities on price tags. Therefore, the color ratios of a plurality of target commodity pictures can be clustered to determine a color identifier for a target commodity, namely the variation range of the color ratios of the target commodity. Of course, the color identifier of the target commodity can also be determined by adopting other classification algorithms. The commodity bar code association model adopts a convolutional neural network structure, which is obtained through training in a deep learning framework.

Figure 7:
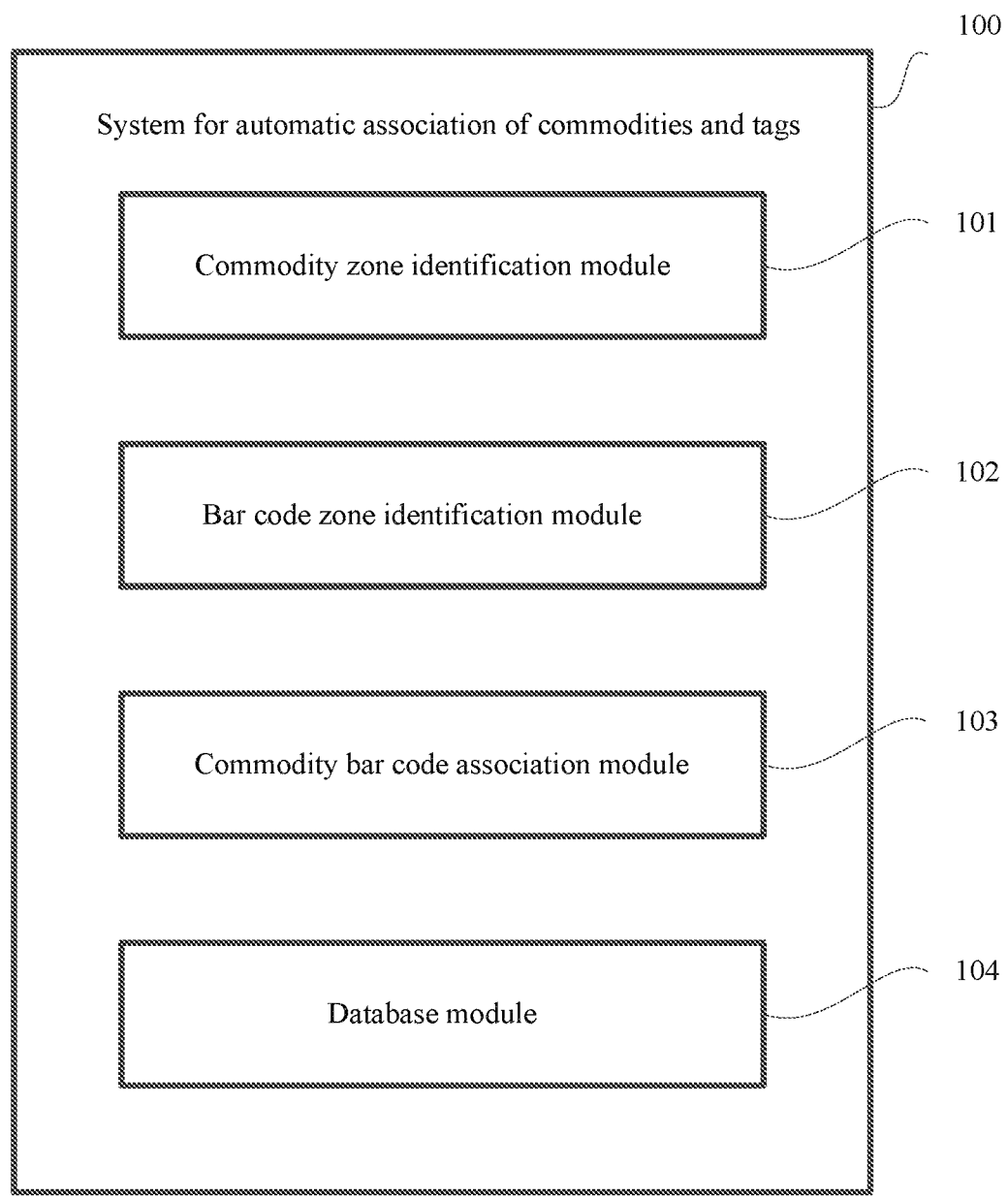
FIG. 7 is a schematic view of modules of a system for automatic association of commodities and price tags in an embodiment of the present invention.

FIG. 7 is a schematic view of modules of a system for automatic association of commodities and price tags in an embodiment of the present invention. As shown in FIG. 7, the system for automatic association of commodities and price tags provided by the present invention, used for implementing the method for automatic association of commodities and price tags, includes:

a commodity zone identification module for acquiring several pictures, performing unit detection on each one of the pictures, and identifying a plurality of commodity zones within each one of the pictures;

a price tag zone identification module for carrying out price tag detection on each one of the pictures and identifying a plurality of price tag zones within each one of the pictures;

a commodity bar code association module for determining a target price tag zone, corresponding to each one of the commodity zones, among a plurality of price tag zones, identifying the bar code of each one of the price tag zones, and reading first commodity information corresponding to each one of the bar codes;

a database module for storing the corresponding relationship between the commodity zone and the first commodity information of each one of the bar codes.

In another embodiment of the present invention, a device for automatic association of commodities and price tags is also provided, including a processor, and a memory which stores executable commands of the processor, where the processor is configured to execute, via executing the executable commands, the steps of the method for automatic association of commodities and labels.

As mentioned above, in the embodiment of the device for automatic association of commodities and price tags, a database is established by acquiring pictures of shelves and commodities in a shopping mall, identifying commodities and bar codes in each one of the pictures, and associating the first commodity information read from each one of the bar codes with the picture of each corresponding one of the commodities one by one, thus facilitating management on commodities.

Those skilled in the art can understand that the present invention can be implemented as a system, a method or a program product. Therefore, the present invention can be implemented in the following specific methods, namely a complete hardware implementation method, a complete software implementation method (including firmware, micro-code, etc.), or a hardware- and software-combined implementation method. Here, the implementation method can be called "circuit", "module" or "platform".

Figure 8:
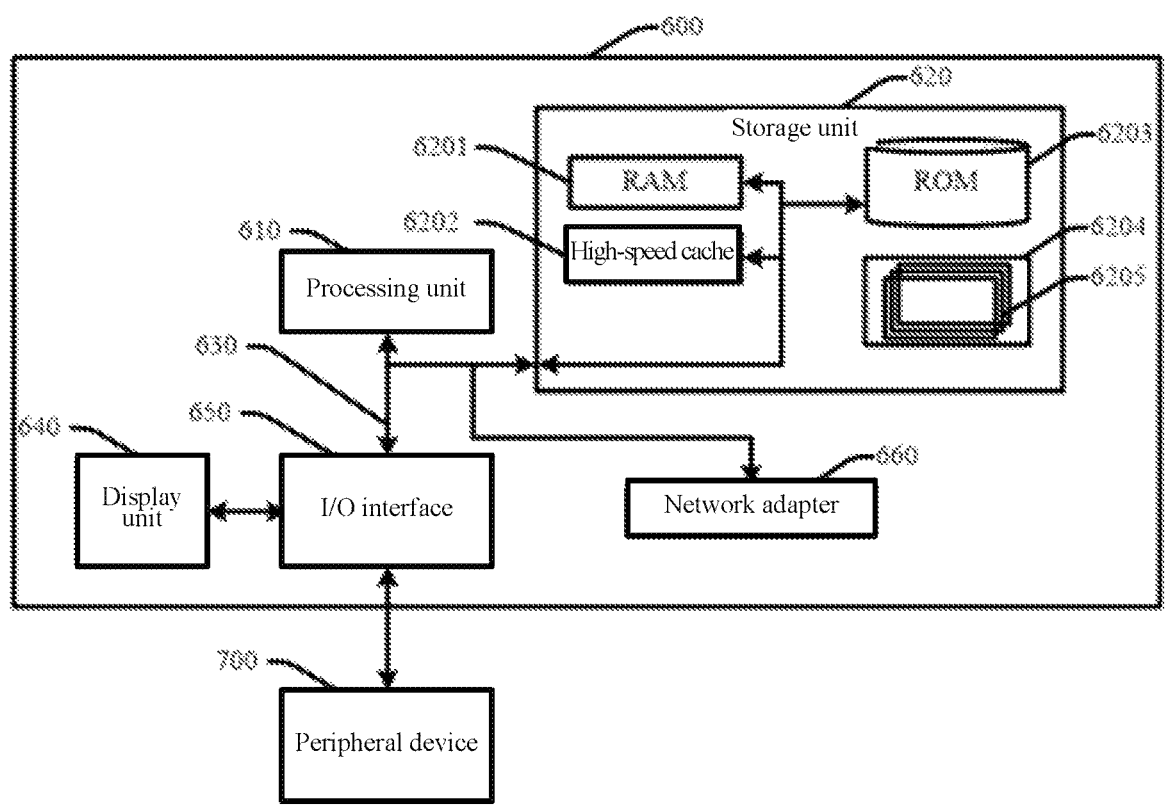
FIG. 8 is a structural view of a device for automatic association of commodities and price tags in an embodiment of the present invention.

FIG. 8 is a structural view of a device for automatic association of commodities and price tags of the present invention. An electronic device 600 in such embodiment of the present invention is described with reference to FIG. 8. The electronic device 600 displayed in FIG. 8 is merely an example, which should not impose any limit to the functions and application scope of the embodiment of the present invention.

As shown in FIG. 8, the electronic device 600 is presented in the form of a universal computing device. The electronic device 600 may include, but is not limited to, the following components: at least one processing unit 610, at least one storage unit 620, buses 630 connected to different platform components (including the storage unit 620 and the processing unit 610), a display unit 640, etc.

In this embodiment, the storage unit stores program codes, and the program codes can be executed by the processing unit 610 such that the processing unit executes the steps of various exemplary embodiments of the method for automatic association of commodities and price tags of the present invention. For example, the processing 610 can execute the flow process as shown in FIG. 1.

The storage unit 620 may include a readable medium in the form of a volatile storage unit, for example, a RAM (Random Access Memory) 6201 and/or a high-speed cache storage unit 6202, and may further include a ROM (Read-Only Memory) 6203.

The storage unit 620 may also include a program/practical tool 6204 with at least one group of (at least one) program module 6205. Such program module 6205 includes, but is not limited to: an operating system, one or more application programs, other program modules and program data. Every one or a certain combination of the examples may include implementation in a network environment.

The buses 630 may be selected from one or more types of several bus structures, including a storage unit bus or a storage unit controller, a peripheral bus, a graphic acceleration port, a processing unit or a local area bus which uses any bus structure among a plurality of bus structure.

The electronic device 600 may communicate with one or more peripheral devices 700 (for example, a keypad, a pointing device, a Bluetooth device, etc.), may communicate with one or more devices by which users can interact with the electronic device 600, and/or any device (for example, a router, a modulator, etc.) which enables the electronic device 600 to communicate with one or more other computing devices. Such communication may be carried out by an input/output (I/O) interface 650. Moreover, the electronic device 600 may communicate with one or more networks (for example, a local area network (LAN), a wide area network (WAN) and/or a public network, for example Internet) through a network adapter 660. The network adapter 660 may communicate with other modules of the electronic device 600 through the buses 630. It should be understood that, though not shown in FIG. 8, the electronic device 600 can be used in combination with other hardware and/or software modules which include, but are not limited to: a micro-code, a device drive, a redundant processing unit, an external magnetic disc drive array, a RAID system, a magnetic tape drive, a data backup storage platform, etc.

Based on the above embodiments, in other embodiments of the present invention, a computer readable storage medium can be provided for storing programs, and when programs are executed, the steps of automatic association of commodities and price tags are executed. In some possible implementation methods, the present invention may also be implemented as a program product which includes program codes. When the program product is running at a terminal device, the program codes drive the terminal device to execute the steps of exemplary embodiments of the method for automatic association of commodities and price tags of the present invention.

As mentioned above, when the programs of the computer readable storage medium in this embodiment are executed, a database is established by acquiring pictures of shelves and commodities in a shopping mall, identifying commodities and bar codes in each one of the pictures, and associating the first commodity information read from each one of the bar codes with the picture of each corresponding one of the commodities one by one, thus facilitating management on commodities.

According to this embodiment of the present invention, the program product for implementing the above method may be a portable compact disc read-only memory (CD-ROM) which includes program codes and may be running at a terminal device, for example, a personal computer. However, the program product of the present invention is not limited to the above description. In this text, the readable storage medium may be any physical medium including or storing programs, and the programs can be used by any or combination of a command execution system, device and apparatus.

The program product may be one or combination of a plurality of readable media. The readable medium may be a readable signal medium or a readable storage medium. The readable storage medium may be, but is not limited to, any one or combinations of electronic, magnetic, optical, electromagnetic, infrared or semiconductor systems, devices or apparatuses. A better example of the readable storage medium (non-exhaustive list) includes any one or any combination of an electronic connection with one or more conductors, a portable disc, a hard disc, a random access memory (RAM), a read only memory (ROM), an erasable programmable read-only memory (EPROM or flash memory), an optical fiber, a portable compact disc read-only memory (CD-ROM), an optical storage device and a magnetic storage device.

The computer readable storage medium may include a data signal broadcast in a base band or as a part of a carrier wave, where the data signal bears readable program codes. The broadcast data signal may be in various forms, including, but not limited to, an electromagnetic signal, optical signal or any combination thereof. The readable storage medium may also be any readable media other than the readable storage medium. The readable medium can send, broadcast, or transmit programs by any one or a combination of the command execution system, device, and apparatus. The program codes included by the readable storage medium may be transmitted by any proper medium, including but not limited to, wireless, wired, cabled and RF media, or any combination of the mentioned media.

The program codes for executing operations of the present invention can be written by one or any combination of a plurality of program design languages. The program design languages include object-oriented program design languages, such as Java, C++, etc., and also include conventional procedural program design languages, such as "C" language or similar program design languages. The program codes can be executed on the user computing device completely or partly, executed as an independent software packet, executed partly on the user computing device and partly on the remote computing device, or executed on a remote computing device or server completely. In the cases involved with remote computing devices, a remote computing device may be connected to a user computing device through any type of networks including the local area network (LAN) or the wide area network (WAN), or connected to an external computing device (for example, through the Internet provided by an Internet service provider).

In the above embodiments of the present invention, the database is formed by acquiring pictures of shelves and commodities in the shopping mall, identifying the commodities and bar codes in the pictures, and associating the first commodity information read from each one of the bar codes with the picture of each one of the commodities one by one, thus facilitating commodity management. According to the present invention, the text message of each one of the price tag zones is identified and the second commodity information is generated. If the second commodity information is inconsistent with the first commodity information identified from each corresponding one of the pictures, an alarm signal to be sent, and then the marking errors on each one of the price tags can be corrected. In the present invention, a database in which the first commodity information corresponds to the picture of each one of the commodities one by one can be formed, the commodity information of a commodity can be retrieved when pictures of the commodity are obtained, and then a corresponding price tag is printed, thus improving the accuracy of price tag printing.

The above is a detailed description of the specific embodiments of the present invention. It should be understood that the present invention is not limited to the above specific embodiments. Those skilled in the art can make various changes and modifications within the scope of the claims, without affecting the substantial content of the present invention.

We claim:
1. A method for automatic association of commodities and price tags, comprising:
S1: acquiring several pictures, carrying out unit detection on each one of the pictures, and identifying a plurality of commodity zones within each one of the pictures;
S2: carrying out price tag detection on each one of the pictures, and identifying a plurality of price tag zones within each one of the pictures;
S3: identifying a bar code in each one of the price tag zones, reading first commodity information corresponding to each one of the bar codes, and then verifying the commodity zone corresponding to the bar code in each one of the price tag zones;
S4: associating the commodity zone of each one of the bar codes with the corresponding first commodity information, and then storing the associated data into a database; and

S5: the method further comprises identifying a text message in each one of the price tag zones, generating second commodity information, and when the second commodity information of a price tag zone is inconsistent with the first commodity information, sending an alarm signal;
wherein the S2 further comprises carrying out price tag detection on each one of the pictures, and identifying a plurality of price tag zones within each one of the pictures; setting the price tag zones which are arrayed in turn along the set direction as a price tag zone set when a plurality of price tag zones are arrayed in turn along a set direction; and forming at least one price tag zone set in each one of the pictures, and excluding price tag zones outside of the price tag zone set.

2. The method of claim 1, wherein the step S3 comprises:
S301: in each one of the pictures, transversely arraying a plurality of commodity zones in turn to form a commodity zone row, and transversely arraying a plurality of price tag zones in turn to form a price tag zone row, where at least one price tag zone row is formed on the upper side or/and the lower side of the commodity zone row;
S302: calculating the distance between the central point of each one of the price tag zones and the central point of each one of the adjacent commodity zones, and determining the commodity zone closest to the central point of each one of the price tag zones; and
S303: associating each one of the price tag zones as a target price tag zone with a commodity zone closest to the central point of each one of price tag zones.

3. The method of claim 1, wherein the step S1 comprises:
S101: marking the commodity zones within each one of a plurality of the detected pictures, generating a plurality of training pictures for commodity zone identification, and training a commodity identification model through the training pictures for commodity zone identification;
S102: automatically extracting a target reference line according to an object profile in each one of the pictures, and rotating each one of the pictures such that each one of the target reference lines is parallel to a set reference line; and
S103: implementing enhancement processing on the aligned pictures, and inputting the pictures into the commodity identification model for identification.

4. The method of claim 1, wherein the step S2 comprises:
S201: marking price tag zones in each one of a plurality of the detected pictures, and generating a plurality of training pictures for price tag identification;
S202: marking to-be-excluded price tag zones in each one of a plurality of the detected pictures, and generating a plurality of training pictures for price tag exclusion;
S203: training a price tag identification model through the plurality of training pictures for price tag identification and the plurality of training pictures for price tag exclusion;
S204: automatically extracting a target reference line according to an object profile in each one of the pictures, and rotating each one of the pictures such that each one of the target reference lines is parallel to a set reference line; and
S205: implementing enhancement processing on the aligned pictures, and inputting the pictures into the price tag identification model for identification.

5. The method of claim 1, wherein the step S3 comprises:

S301: acquiring a plurality of target commodity pictures for a target commodity corresponding to a bar code from different sites;

S302: calculating a descriptor of each one of the target commodity pictures, and determining a characteristic identifier of the target commodity according to the descriptor of each one of a plurality of the target commodity pictures;

S303: repeating steps S301-S302 to generate a descriptor for a target commodity corresponding to each one of a plurality of bar codes, and then calculating a target commodity characteristic identification model;

S304: acquiring a plurality of target commodity pictures corresponding to a bar code from different sites to form a group of training pictures for commodity bar code association;

S305: repeating S304 to generate a group of training pictures for commodity bar code association, corresponding to each one of a plurality of bar codes;

S306: training a commodity bar code association model through a plurality of groups of training pictures for commodity bar code association; and S307: determining the commodity zone corresponding to the bar code in each one of the price tag zones in turn through the target commodity characteristic identification model and the commodity bar code association model.

6. A system for automatic association of commodities and price tags, configured for implementing the method of claim 1, comprising: a commodity zone identification module for acquiring several pictures, performing unit detection on each one of the pictures, and identifying a plurality of commodity zones within each one of the pictures; a price tag zone identification module for identifying a bar code in each one of price tag zones, reading first commodity information corresponding to each one of the bar codes, and determining the commodity zone corresponding to the bar code in each one of the price tag zones; a commodity bar code association module for determining a target price tag zone, corresponding to each one of the commodity zones, among a plurality of price tag zones, identifying the bar code of each one of the price tag zones, and reading the first commodity information corresponding to each one of the bar codes; a database module for storing the corresponding relationship between the commodity zone and the first commodity information of each one of the bar codes.

7. A device for automatic association of commodities and price tags, comprising: a processor and a memory storing executable commands of the processor; wherein the processor is configured to execute, via executing the executable commands, the steps of the method for automatic association of commodities and price tags of claim 1.

* * * * *